R. E. HELLMUND.
SYSTEM OF CONTROL.
APPLICATION FILED MAY 3, 1916.
1,363,647.
Patented Dec. 28, 1920.
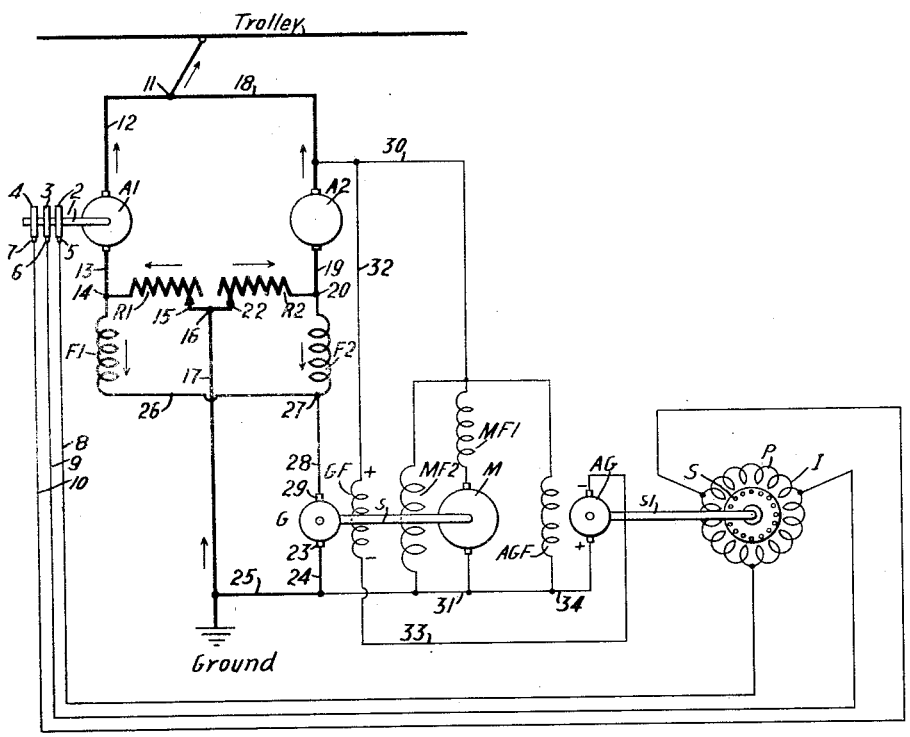
WITNESSES:
Fred. A. Lind.
W. R. Coley
INVENTOR
Rudolf E. Hellmund
BY
Wesley G. Carr
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,363,647.  Specification of Letters Patent.  Patented Dec. 28, 1920.

Application filed May 3, 1916. Serial No. 95,023.

*To all whom it may concern:*

Be it known that I, RUDOLF E. HELLMUND, a subject of the Emperor of Germany, and a resident of Pittsburgh, in the county of Allegheny and State of Pennsylvania, have invented a new and useful Improvement in Systems of Control, of which the following is a specification.

My invention relates to systems of control for dynamo-electric machines and especially to the regenerative control of direct-current, electric-vehicle motors and the like, under predetermined conditions.

One of the objects of my invention is to provide, in a system of the above-indicated character, automatic means for preventing the attainment of dangerously high main-machine voltages under emergency conditions, such as the interruption of supply-circuit voltage by reason of the trolley leaving the wire, for example.

A further object of my invention is to provide a combination of auxiliary dynamo-electric machines in connection with the excitation of the main-machine field winding during the regenerative period, whereby such excitation may be inherently and automatically varied oppositely to the incipient variations of regenerated current, thus producing a negative compound effect and maintaining a substantially constant regenerative current throughout a relatively wide range during the retarding period.

More specifically stated, it is an object of my present invention to provide a system of the type wherein an auxiliary source of energy, such as a generator of small capacity, is employed to excite the main field winding or windings during the regenerative period, and wherein an auxiliary exciting machine that is operated in accordance with the frequency of the alternating current in the main momentum-driven armature is adapted to oppose the excitation of the main exciting machine, thereby strengthening the effective excitation of the main exciting machine and, consequently, of the main-machine field winding as the main-machine speed decreases during the period of retardation.

My invention may best be understood by reference to the accompanying drawing, the single figure of which is a diagrammatic view of a system of control embodying my invention.

Referring to the drawing, the system shown comprises a plurality of suitable supply-circuit conductors respectively marked "Trolley" and "Ground"; a plurality of main direct-current dynamo-electric machines, respectively having armatures A1 and A2 and field-magnet windings F1 and F2 of the series type; a plurality of main-circuit variable resistors R1 and R2 that are associated with the main-machine armatures in a manner to be described; an auxiliary motor-generator set embodying a driving armature winding M and a generator armature winding G for energizing the main field windings F1 and F2; and a second auxiliary motor-generator set comprising a driving induction motor I and a driven generator armature AG that is associated with the first mentioned motor-generator set in a manner to be set forth.

The driving auxiliary armature winding M is shown as provided with a series-connected field-magnet winding MF1 and a shunt-connected field-magnet winding MF2, while the generator armature G is excited by a shunt field-magnet winding GF that is energized as hereinafter set forth. The auxiliary armatures M and G may be mechanically connected in any suitable manner, for instance, by means of a shaft $s$.

The driving induction motor I of the other motor-generator set comprises a suitable polyphase stator or primary winding P, and a secondary or rotor winding S which may conveniently be of the well-known squirrel-cage type. The auxiliary generating armature AG may be mechanically associated with the rotor of the induction motor I in any appropriate manner, as by a shaft $s1$, and a field-magnet winding AGF of the shunt type is provided for the armature AG.

The main armature A1 is shown as provided with an extension 1 of the armature shaft, upon which extension slip rings 2, 3 and 4 may be suitably disposed to be connected to the armature winding in any well-known manner to deliver balanced three-phase voltages. Inasmuch as such slip-ring connections are old and familiar in the art, it is not believed necessary to show or describe the same in the present application. The slip rings 2, 3 and 4 are respectively connected through suitable brushes 5, 6 and 7 and conductors 8, 9 and 10, to the terminals of the primary winding P of the auxiliary induction motor I. Consequently, the induction motor I is supplied with alternating current of a frequency corresponding to the speed of the main armature A1 to drive the auxiliary generating armature AG in such manner that the voltage delivered thereby varies in accordance with the changes of main armature speed, for a purpose to be set forth.

Since the particular type of regenerative control system that is employed is, in most respects, immaterial to my present invention, I have not deemed it necessary to fully show or describe means for connecting the various machines in the desired manner at the beginning of the regenerative period and for then connecting the main momentum-driven machines to the supply circuit when conditions are proper. It will be understood that any suitable or well-known means for accomplishing such results may be employed.

Assuming, therefore, that regenerative operation has been inaugurated and that the main-circuit and auxiliary circuit connections are as illustrated, such connections may be traced as follows: One main circuit is established from the trolley through junction-point 11, conductor 12, main armature A1, conductor 13, junction-point 14, main-circuit resistor R1, a suitable switching device 15, here conventionally shown as an arrow-head, for varying the resistor R1 under predetermined conditions, junction-point 16 and conductor 17 to the negative conductor Ground. A similar main circuit is also established from the junction-point 11 through conductor 18, main armature A2, conductor 19, junction-point 20, main circuit resistor R2, switching device 21, which corresponds to the other switching device 15, and thence through junction-point 16 and conductor 17 to the negative conductor Ground.

One terminal 23 of the auxiliary exciting armature G is connected through conductors 24 and 25 to the conductor 17 and the junction-point 16, where the circuit divides, one branch including switching device 15, main-circuit resistor R1, junction-point 14, main field winding F1 and conductor 26 to a junction-point 27, and the other branch including switching device 21, main-circuit resistor R2, main field winding F2 and the junction-point 27, whence circuit is completed through conductor 28 to the other terminal 29 of the auxiliary armature winding G.

The connections just described are fully set forth and claimed in my co-pending application, Serial No. 44,443, filed August 9, 1915, issued April 1, 1919, No. 1,298,706.

An auxiliary circuit is completed from the conductor 18 through the series field winding MF1 and the driving armature M to conductor 31 which is connected to conductor 25 and therefore, to ground. The main field winding MF2 for the armature M is connected intermediate conductors 30 and 31 and is thus directly connected across the supply circuit.

Another auxiliary circuit is completed from the conductor 30 through conductor 32, the field-magnet winding GF of the main exciting armature G, conductor 33, auxiliary exciting armature AG and conductor 34 to the negative conductor 31. As indicated by the positive and negative signs, the voltage of the auxiliary exciting armature AG is adapted to oppose the voltage that is impressed upon the auxiliary field winding GF from the supply circuit, for a purpose about to be set forth. The field-magnet winding AGF for the armature AG is connected between conductors 30 and 34 to receive the full supply-circuit voltage.

The operation of the above-described system, in so far as my present invention is concerned, may be set forth as follows: Since the voltage of the auxiliary exciting armature AG is indirectly dependent upon the frequency that is generated within the main armature A1, that is to say, upon the speed of the main armature, as hereinbefore described, it will be noted that the effective field flux that is delivered by the auxiliary field winding GF to the armature G varies inversely with such speed conditions. In other words, under relatively high-speed conditions of the main armature or armatures, as at the beginning of the regenerative period, a relatively low voltage will be delivered by the auxiliary armature G to the main field windings F1 and F2, but the arrangement of parts is, of course, such that a suitable value of exciting current will traverse the main field winding in the direction indicated by the corresponding arrows; whereas, during the gradual speed decrease of the momentum-driven machines, the effective field excitation of the auxiliary armature G will be accordingly increased by reason of the reduced speed of the induction motor I, and thus, a substantially constant regenerated current will be maintained as the vehicle speed decreases, by reason of the counteracting increase of the main field-winding excitation that is supplied by the auxiliary armature G.

To carry such regulation to a point beyond where it may be feasible to employ the automatic regulation just described, or to vary the regenerative operation in any desired manner at some period of the retarding operation, the switching devices 15 and 22 that are respectively associated with the main-circuit resistors R1 and R2, may be manually or automatically actuated, preferably in accordance with the regenerated current, as fully set forth in my above-identified co-pending application.

A further advantage of my present invention resides in its inherent and automatic regulating features under emergency conditions, such as the interruption of supply-circuit voltage by reason of the vehicle current-collecting device leaving the supply-circuit wire, for example. Under such circumstances, the main momentum-driven machines tend to continue to generate current and deliver it to the auxiliary regulating system, with the result that a sudden rise of generated voltage occurs, possibly accompanied by an increase of main-machine speed, whereby the auxiliary driving armature M will speed up and the auxiliary armature G will tend to increase the excitation of the main machines, the voltage of which is again raised; and the cycle will continue in the manner outlined, unless some preventive means is employed, until abnormal conditions are attained which cause "flash-over" troubles in some of the dynamo-electric machines.

Such a sudden and dangerous rise of voltage is, however, prevented by the use of my present system, since an incipient increase of regenerated voltage, under the above-mentioned emergency conditions, correspondingly augments the excitation of the auxiliary field winding AGF, whereby the opposing voltage of the auxiliary armature AG is accordingly increased to effect a predetermined decrease of the effective flux that is created by the auxiliary field winding GF of the main exciting armature AG. In this manner, the above-mentioned abnormal rise of voltage is rapidly and effectively counteracted.

It will be understood that any other operatively equivalent means for producing a voltage that varies with the speed of the main momentum-driven machines may be employed in place of the induction-motor-driven motor-generator set, if desired.

Moreover, I do not wish to be restricted to the specific circuit connections or location and arrangement of parts herein set forth, as various modifications thereof may be made without departing from the spirit and scope of my invention. I desire, therefore, that only such limitations shall be imposed as are indicated in the appended claims.

I claim as my invention:

1. In a system of control, the combination with a direct-current armature and a field winding, of auxiliary means for energizing said field winding, auxiliary dynamo-electric means for varying the exciting effect of said auxiliary means, and means operated in accordance with the frequency in said direct-current armature for driving said auxiliary dynamo-electric means.

2. In a system of control, the combination with a main direct-current dynamo-electric machine having an armature and a field winding, of an auxiliary dynamo-electric machine for energizing said field winding, dynamo-electric means for varying the excitation of said auxiliary machine, and a driving machine for said dynamo-electric means energized and operated in accordance with the frequency of alternating current in the main armature.

3. In a system of control, the combination with a main dynamo-electric machine having an armature and a field winding, of an auxiliary dynamo-electric machine having a field winding and having an armature connected to energize the main field winding, a second auxiliary machine for opposing the action of the first auxiliary machine field winding, and a driving machine for said second auxiliary machine energized and operated in accordance with the frequency of alternating current in the main armature.

4. In a system of regenerative control, the combination with a supply circuit, and a momentum-driven direct-current main dynamo-electric machine having an armature and a field winding, of an auxiliary driven generator having a field winding and having an armature connected to energize the main field winding, a second auxiliary dynamo-electric machine having an armature connected in opposing series relation with the first auxiliary machine field winding across said supply circuit, an induction motor for driving said second auxiliary machine, and means for supplying alternating current from the main armature to said induction motor, whereby the main field excitation from said first auxiliary machine is caused to vary oppositely to the speed of the main armature.

5. In a system of control, the combination with a dynamo-electric machine having an armature and a field winding, of means for exciting said field winding and for varying the excitation oppositely to the machine speed, and further means for varying the excitation oppositely to variations of armature current.

6. In a system of control, the combination with a dynamo-electric machine having an armature and a field winding, of a resistor connected in series relation with said armature, an auxiliary exciting machine connected through said field winding across said resistor, and means for varying the voltage of said exciting machine in accordance with the machine speed.

7. In a system of control, the combination with a dynamo-electric machine having an armature and a field winding, of an auxiliary machine for exciting said field winding, a further machine for controlling the excitation of said auxiliary machine, and electrical means for regulating said further machine to decrease the voltage of the auxiliary machine upon an increase of machine speed.

8. In a system of control, the combination with a dynamo-electric machine having an armature and a field winding, and auxiliary exciting means mechanically independent of said machine for independently influencing the excitation of said field winding in accordance with the voltage and the speed of said machine.

9. In a system of control, the combination with a dynamo-electric machine having an armature and a field winding, an auxiliary exciting armature for said field winding, a motor energized in accordance with the main-machine voltage for driving said auxiliary armature, and a second auxiliary machine dependent upon the main-machine speed for controlling the excitation of said auxiliary armature.

10. In a system of control, the combination with a direct-current dynamo-electric machine having an armature and a field winding, an auxiliary armature for supplying exciting current to said field winding, means for varying said exciting current in accordance with the frequency in the armature of said direct-current machine, and independent means for varying said current in accordance with predetermined main-machine-circuit conditions.

In testimony whereof I have hereunto subscribed my name this 26th day of April, 1916.

RUDOLF E. HELLMUND.